United States Patent [19]

Cottancin

[11] 4,309,163
[45] Jan. 5, 1982

[54] MOULD ASSEMBLY FOR MOULDING ELASTOMERS

[75] Inventor: Gerard Cottancin, Lyons, France

[73] Assignee: Societe Lyonnaise de Ventilation Industrielle Solyvent-Ventec, Lyons, France

[21] Appl. No.: 163,352

[22] Filed: Jun. 26, 1980

[30] Foreign Application Priority Data

Jun. 26, 1979 [FR] France .................. 79 16391

[51] Int. Cl.³ .............................................. B29F 1/08
[52] U.S. Cl. ............................ 425/543; 264/328.2; 264/328.7; 264/328.8; 264/328.15; 264/328.16; 425/548; 425/549; 425/572; 425/588
[58] Field of Search ............. 264/328.2, 328.4, 328.7, 264/328.15, 328.16, 328.8; 425/543, 548, 549, 564, 568, 572, 588

[56] References Cited

U.S. PATENT DOCUMENTS

| | | | |
|---|---|---|---|
| 2,672,653 | 3/1954 | Simpkins | 425/572 X |
| 3,591,897 | 7/1971 | Perras | 425/543 X |
| 3,797,984 | 3/1974 | Yago | 425/543 |
| 4,212,627 | 7/1980 | Gellert | 425/572 X |
| 4,238,181 | 12/1980 | Dannels | 425/548 X |

FOREIGN PATENT DOCUMENTS 2425621 12/1975 Fed. Rep. of Germany ...... 425/568
1487410 7/1967 France .

*Primary Examiner*—Thomas P. Pavelko
*Attorney, Agent, or Firm*—Lee, Smith & Jager

[57] ABSTRACT

This mould assembly for elastomers is of the type comprising a center block whose temperature is regulated. The block has means for injection of the elastomer into each mould cavity fed with elastomer by a nozzle of the injection device of the press. The center block has projections which are mounted on the block, or are part of the same material as the block, and project from two of opposite sides of the block. Small nozzles for directly injecting the elastomer into the mould cavities are detachably secured on the ends of the projections and adapted to cooperate with adjacent sections of at least two moulds in two or more sections which are disposed on the opposite sides of the center block. Means distinct from those of the block are provided for separately controlling the temperature of the projections and of the small nozzles. Means are provided for controlling the flow through the small nozzles. Means are provided for compensating for the expansion of the block and the moulds. The mould assembly further comprises a special nozzle for feeding elastomer to the block, the temperature of the special nozzle being controllable.

13 Claims, 5 Drawing Figures

MOULD ASSEMBLY FOR MOULDING ELASTOMERS

The present invention concerns generally the moulding of rubber and other elastomeric materials by injection under pressure and it is more particularly related to the moulds employed for this moulding.

It is known that the moulds employed for the injection moulding under pressure of elastomeric materials have certain similarities with those employed for thermoplastic materials.

In the last-mentioned art, there were initially employed simple moulds, i.e. moulds comprising two sections with the injection of the material through one thereof, then there were employed moulds having two parting lines, i.e. having two moulding sections disposed on each side of a central section having passages for conveying the material to the cavities of the two moulding sections. The last mentioned moulds enabled the production of moulded parts to be doubled in each operation.

At the present time, there is employed for the moulding of elastomers the injection/compression technique which comprises, with the use of a simple two-section mould, maintaining these sections slightly spaced apart in the course of the injection of the plasticized elastomer, injecting, in the cavities or in the vicinity of the cavities, a volume of material which is slightly larger than that necessary for filling the cavities and thereafter bringing the two sections of the mould closer together so as to force the material to flow and fill the cavities, the surplus overflowing from the latter.

At the end of the operation, the distance which initially existed between the sections of the mould has been decreased to a value which is equal to the thickness of the film of vulcanized material remaining between the cavities at the end of the moulding cycle.

French Pat. No. 1,487,410 filed by the Applicant discloses a process and a device for eliminating the flashes by controlling with precision the distance between the moulds when injecting and when closed.

In this process, there are slidably disposed in corresponding parallel grooves, provided in the two sections of the mould, two equal parallel elongated elements in the shape of a trapezium and interconnected to form a frame so that their position in translation in the grooves, whose shape is complementary to that of the elements, determines the minimum possible distance between the sections of the mould.

First of all the position of the elements is so adjusted as to determine the distance therebetween before the injection, then the material is injected, and then the elements are displaced by sliding them in translation so as to allow an almost complete closure of the mould, and then the compression stage is carried out until the sections of the mould come in contact with the two elements which thereby form spacer members whose thickness is adjustable with high precision.

Further, various moulding devices are known in which, as disclosed in particular in French Pat. No. 2,022,339, the different sections of a moulding assembly comrise temperature regulating fluid agent circulating circuits. Another device, developed by the Applicant, comprises an injection block whose temperature is controlled and which has injecting means at the ends of short projections on the block for injecting the plasticized material into the cavities of a mould through one of the two sections of the latter.

In this device, a slab of insulating material is disposed between the injection block and the adjacent section of the mould, the temperature of the block being controlled in such manner as to remain lower than the temperature of vulcanization of the moulded material.

The construction of a mould of this double parting line type which doubles the number of mould cavities and consequently the number of parts moulded in each moulding cycle as described above with reference to double parting line moulds employed for thermoplastic materials, has not been possible up to the present time owing in particular to problems concerning the supply and regulation of the temperature of the different sections of the mould.

An object of the invention is to overcome these problems and to provide such a double parting line mould which may be used in different types of presses for moulding rubber and other elastomeric materials.

According to the invention, there is consequently provided a mould assembly for use with a press for the injection/compression moulding of elastomers and in particular for the moulding of high precision parts, the assembly being of the double parting line type comprising a centre block having a regulated temperature and a feed orifice, injection means for each mould cavity or group of mould cavities supplied with elastomer through passages by a nozzle of the injection device of the press, and a slidable spacer frame having an oblique profile, said mould assembly being so arranged that said centre block has projections or small nozzle spigots, which are mounted on or form part of the block and project from two opposite sides of the block, small injection nozzles for the direct injection of the elastomer into the mould cavities and detachably fixed to the ends of said projections and adapted to cooperate with adjacent portions of at least two moulds which are in two or more sections and are disposed on said opposite sides of the centre block, means distinct from those of the block for separately controlling the temperature of said projections and the temperature of the small nozzles, means for controlling the flow through the small nozzles, means for compensating for the differential expansion of the block and the two moulds, the assembly further comprising a special nozzle for supplying elastomer to said centre block and having an elongated body including means for controlling its temperature and adapted to cooperate with a centre projection of the body connected to said small nozzles by a system of passages.

Further features and advantages of the invention will be apparent from the ensuing description.

In the accompanying drawings given merely by way of example:

Figure 1:
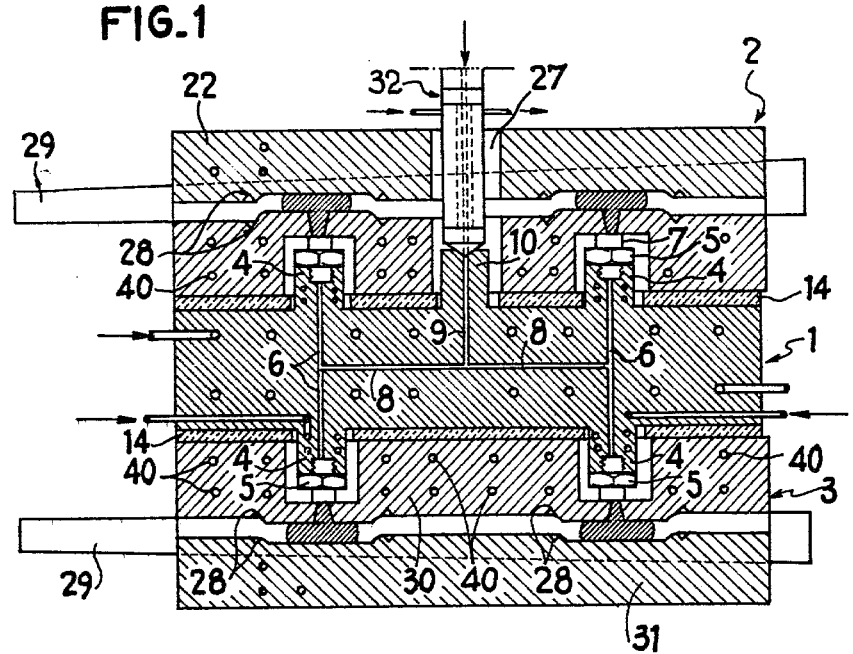
FIG. 1 is a side elevational and sectional view of a double parting line mould assembly according to the invention, in the position thereof in the injection stage.
Figure 2:
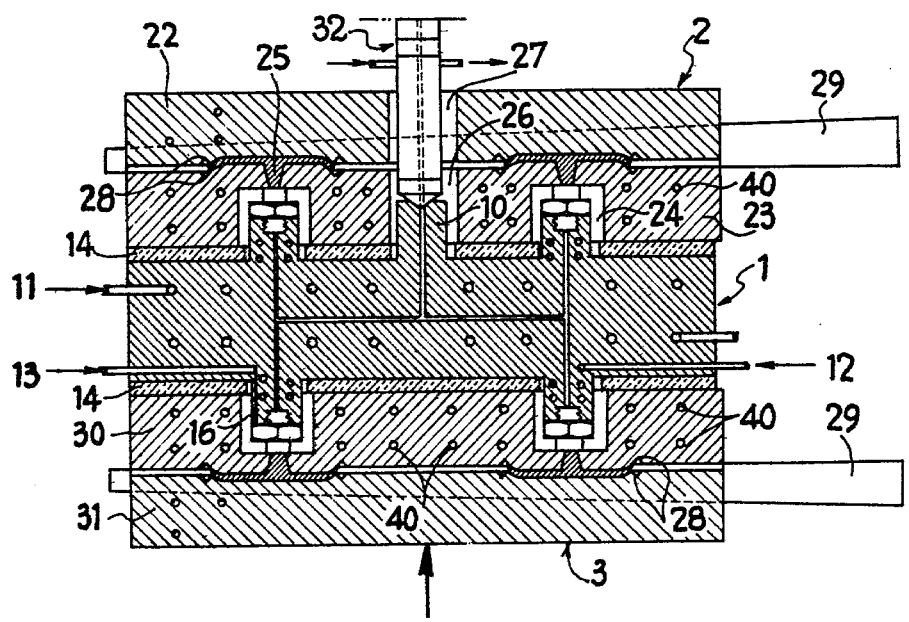
FIG. 2 is a similar view of the same mould assembly, in the compression position thereof before its complete closure and the vulcanization.

With reference to FIGS. 1 and 2, the mould assembly according to the invention comprises a regulated centre block 1 and an upper mould 2 and a lower mould 3.

The regulated centre block 1 of metal or other suitable material having, for example, a parallel-sided or other shape, comprises on its two parallel opposite large sides projections designated "small nozzle spigots" which are mounted on, or are part of the same material as, the regulated block. Fixed, for example by screwthreads, on the ends of the spigots are small nozzles 5.

In the illustrated embodiment, the block 1 has four nozzle spigots 4 which are disposed symmetrically relative to the axis of the block 1, but it will be understood that the invention is not limited to this number. The block may of course have more than two small nozzles corresponding to more than four mould cavities on each side disposed in a dissymetrical manner relative to the axis of the block.

A passage 6 extends axially in each of the spigots 4 and communicates, on one hand, at one end with a centre bore 7 of each small nozzle and, on the other hand, with passages 8 which are connected to a main passage 9 which extends axially in a fifth spigot 10 which projects substantially in the middle of the upper side of the block 1 and communicates with the exterior of the block 1 for a purpose which will be explained hereinafter.

The block 1 further comprises a first circuit of passages 11 for regulating the temperature of the block proper, a second circuit of passages 12 for regulating the temperature of the spigots and a passage 13 for connection with a circuit 16 for regulating the temperature of the small nozzles, these three circuits being independent (FIG. 2) and having couplings of the sides of the block whereby the various circuits can be connected to temperature regulating devices or sources of known type located outside the block. These circuits may ensure the circulation of oil, water and/or air or other heat carrying fluid so as to maintain the various parts of the assembly at given temperatures.

Disposed on the upper and lower sides of the block 1 are insulating plates 14 of a suitable material and having heat insulating properties and compressive strength for the purpose of insulating the upper and lower moulds 2 and 3 from the centre block 1.

These plates have openings through which extend the nozzle spigots 4 and the spigot 10.

Each small nozzle 5 at the end of each nozzle spigot 4 has a body 15 in which is provided the circuit 16 for the circulation of a heat carrying fluid formed in a mounted ring 16'.

Figure 3:
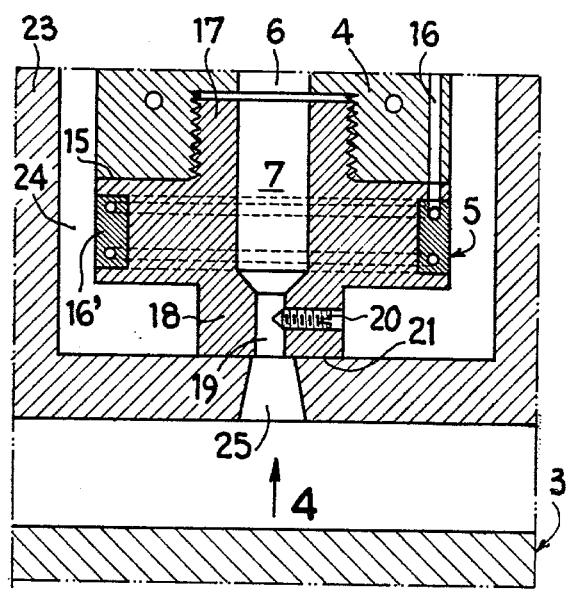
FIG. 3 is a partial vertical sectional view, to an enlarged scale, of the arrangement of a small nozzle comprising means for controlling its temperature and the flow therethrough and means for compensating for the differential expansion.

The body 15 has on one side a screwthreaded boss 17 whereby it is screwed into a complementary tapped hole in the spigot 4, and a cylindrical boss 18 on the opposite side of the body (FIG. 3).

The boss 18 has an outlet orifice 19 which may be partly obturated by a radial needle valve screw 20, the adjustment of which modifies the outlet section of the orifice 19 and consequently the flow through the small nozzle.

The boss 18 has a planar end surface 21 adapted to be put in contact with a portion of a mould disposed in contact with the corresponding insulating plate 14.

The upper mould 2 has an upper section 22 and a lower section 23 in contact with the upper insulating plate 14.

The lower section 23 has recesses 24 which have a flat end and are provided with a centre aperture 25 corresponding to each mould cavity and communicating with the latter, the flat end of each recess being in intimate contact with the planar surface 21 of the corresponding small nozzle. The aperture 25 has a diameter larger than that of the orifice 19, with which orifice it coincides.

Advantageously, the recess 24 has a diameter larger than that of the nozzle spigot so as to define a small radial gap between the spigot 4 and the inner wall of the recess 24.

The section 24 also has an opening 26 through which extends the centre spigot 10 of the block 1.

The upper section 22 of the upper mould has, in a similar way, a centre opening 27 which corresponds with the opening 26 an is adapted to allow the passage of the special injection nozzle of the machine which feeds the elastomer to the mould assembly in the manner described hereinafter.

The mould cavities, which are intended in the presently-described embodiment for the moulding of diaphragms, for example for servo-brakes, are defined, for one half, in one and the other of the sections 22 and 23 of the mould. In other arrangements, these mould cavities may be formed completely in one or the other section of the mould.

Each mould section has around each mould cavity a groove 28 of any cross-sectional shape but preferably having an edge portion adjacent to the mould cavity of a width reduced to a minimum, this edge portion being as near as possible to the edge of the mould cavity.

Each of the two sections of the mould has four grooves (only one of which is shown in the drawings), namely two outer grooves and two inner grooves on each side of the centre opening 26, 27 in which elongated trapezoidal spacer members 29 are slidable, the position of the spacer members being adjustable as described in French Pat. No. 1,487,410 of the Applicant. These spacer members enable the sections of the mould to be spaced apart with an adjustable spacing in the different stages of the moulding.

The lower mould 3 has an upper section 30 in contact with the corresponding insulating plate 14 and a lower section 31, these two sections being in every way identical to the upper and lower sections of the upper mould 2, except that they do not have centre openings 26, 17. Consequently, these sections will not be described in detail.

Figure 5:
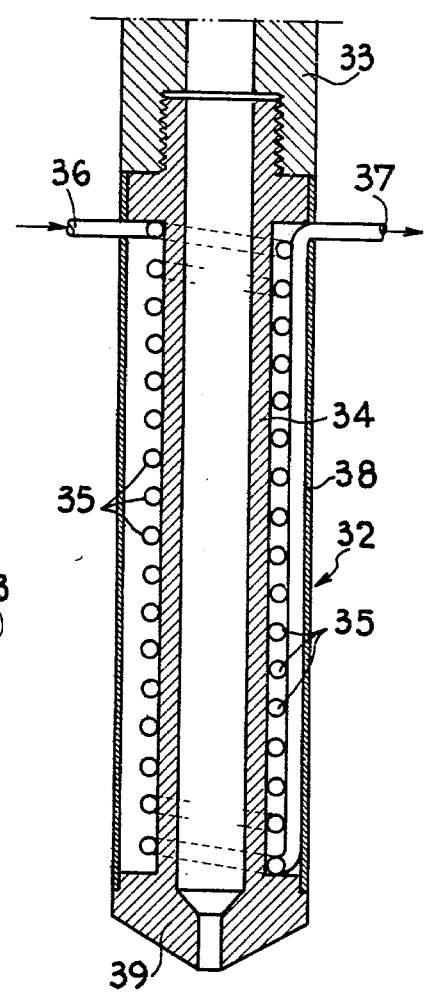

This mould assembly is completed by a feed or supply nozzle 32, shown to enlarged scale in FIG. 5. This nozzle is adapted to feed to the end of the passage 9 of the spigot 10 of the block 1 the plasticized elastomeric material coming from the injection device 33 of the machine to which it must be secured.

The nozzle 32 must consequently have sufficient length to extend to at least the upper section 22 of the upper mould 2.

The length of the spigot 10 of the block 1 is indeed limited so as to enable it to be maintained at the same temperature as the block 1. Consequently, the nozzle connected to the machine must also extend to a certain extent through the lower section 23 of the mould 2.

Owing to this unusual length, the nozzle 32 must be maintained throughout its length at the same temperature as the injection device 33 of the machine or at a different temperature.

Consequently, the nozzle 32 has a body 34 about which there is disposed a fluid circulating circuit 35 having inlet and outlet couplings 36, 37 in the vicinity of the end thereof secured to the machine and surrounded by a case 38.

Apart from its length and its temperature regulating device, the nozzle 32 is moreover identical to conventional injection nozzles and has a conical end 39 adapted to cooperate with a portion of complementary shape provided on the end of the spigot 10 of the block 1.

The mould assembly described hereinbefore is adapted to be employed on most presses for the injection moulding of elastomers which comprise means for controlling the temperature of the press plates.

First of all, the special nozzle is mounted on the injection device instead of the normal shorter nozzle, and the temperature regulating system of the nozzle is connected to a suitable circuit or source of the press.

The temperature regulating systems for the centre block are also connected to circuits or sources of the press or to separate circuits or sources including suitable regulators.

It will be observed that the upper section of the upper mould and the lower section of the lower mould which are in contact with the fixed and moving plates of the press may be heated directly by the latter by conduction, whereas the lower section of the upper mould and upper section of the lower mould, which are adjacent the centre block but insulated from the latter by the insulating plates 14, must have their own heating means which are diagrammatically shown at 40 in FIG. 2. These means may be fluid circulating circuits or electric or other heating circuits. If the press does not have heating plates, the two sections of the moulds must have circuits 40.

The upper and lower moulds must of course be maintained at the temperature of vulcanization of the elastomer, which varies with the type of elastomer but is usually between 140° and 240° C., whereas the centre block with the nozzle spigots 4 and the small nozzles 5 must be maintained at a much lower temperature so as to avoid the vulcanization of the elastomer and the obstruction of the passages, this temperature varying according to the types of elastomers but usually being between the ambient temperature and 140° C.

Under these conditions, it will be understood that the upper and lower moulds expand proportionally more than the centre block, this expansion being the greater, in absolute value, as the moulds are of large size and the temperature difference between the regulated centre block and the moulds is greater.

Consequently, the apertures 25 of the recesses 24 tend to move laterally relative to the orifices 19 of the small nozzles 5.

Owing to the arrangement according to the invention, the offsetting resulting from this expansion is compensated for by the difference between the diameters of the orifices 19 and apertures 25.

Figure 4:
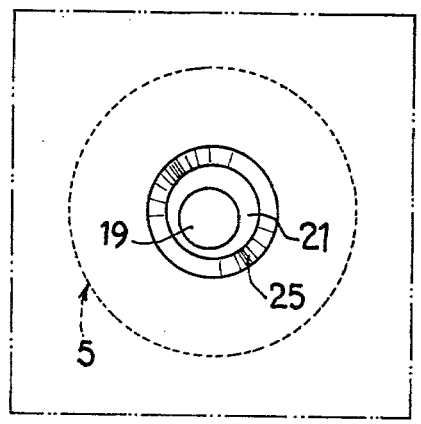
FIG. 4 is a plan view, in the direction of arrow 4 of FIG. 3, showing how the difference in the expansion between the regulated block and the moulds is compensated for, and, FIG. 5 is a vertical longitudinal sectional view of the special feed nozzle of the mould assembly adapted to be mounted on the injection device of the machine.

Indeed, the surface of the end of the recess 24 can slide on the end surface 21 of the associated small nozzle while remaining in contact with the latter. The aperture 25 moves slightly whereas the orifice 19 of small diameter remains within the limits of its circumference, the surface 21 obturating the difference. This is shown in FIG. 4.

In order to use the mould assembly according to the invention, the method described in the aforementioned French patent of the Applicant is employed, according to which, after the stages for moving the mould sections toward each other and the setting of these sections, the slidable frame is adjusted to the appropriate position corresponding to an opening E and, after application of the locking force, a predetermined amount of elastomeric material is injected into the mould cavities.

Then the application of the locking force is interrupted for 1 to 2 seconds so as to slide the spacer frames to the appropriate position corresponding to a minimum spacing e between the sections of the moulds, and then the locking pressure is once again applied so as to force the material to completely fill the mould cavities and then the material is vulcanized.

It will be understood that the amount of material injected must be measured with great precision so as to be just greater than the volume necessary to fill each mould cavity.

Indeed, any amount of material in excess tends to escape from each mould cavity and form around the latter a film which represents a loss of material whose thickness between the sections of the mould has an adverse affect on the precision of the moulded part.

The screw device 20 according to the invention enables the flow through the small nozzles to be regulated with high precision, bearing in mind the different factors for various operating conditions.

This regulation of the flow, in combination with the regulation of the frame having an oblique profile, permits an extremely precise metering or dosing of the amount of material injected into the mould cavities, so that only an extremely small amount escapes from the mould cavities and fills the grooves 28, which enables parts moulded with very high precision to be obtained practically without loss of material.

It is clear to those skilled in the art that the mould assembly according to the invention results in considerable improvements and advantages in the technique of the moulding of elastomers and in particular in the manufacture of high-precision parts. It will be moreover observed that this assembly is easily adaptable to presses of different models and enables the latter to be used under the best conditions and in a more profitable manner by widening the range of their possibilities.

Having now described my invention what I claim as new and desire to secure by Letters Patent is:

1. In a mould assembly for use with a press for the injection/compression moulding of elastomers and in particular for the moulding of high precision parts, the mould assembly comprising a centre block, first temperature regulating means in the block, elastomer injecting passage means in the block, at least one mould combined with a first side of the block and at least one second mould combined with a second side of the block opposed to said first side, each mould having a first mould section adjacent the block and a second mould section which is remote from the block and defines with the respective first mould section mould cavity means and a mould parting line, orifices in the first mould sections and communicating with said injecting passage means in the block and associated with the respective mould cavity means for feeding the mould cavity means with elastomer, and adjustable spacer means interposed between the first mould section and second mould section of each mould for adjusting spacing between each first section and second section in the course of the moulding operation; the improvement comprising in combination first projections rigid with the block and extending from said first and second sides of the block, small nozzles respectively detachably mounted on the projections and engaging said first mould sections and putting said orifices in communication with said injecting passage means in the block, means combined with each small nozzle for controlling the flow of elastomer through the respective small nozzle, second temperature regulating means in said projections and third temperature regulating means in said nozzles, said first, second and third temperature regulating means being independent of one another and having separate ends for connection to separate temperature regulating sources, means for compensating for difference between the expansion of the block and the expansion of the two moulds, a second projection extending from said first side of the block and defining an inlet passage communicating with said injecting passage means in the block, a feed nozzle associated with said second projection for connection to an injecting element of said press so that the elastomer can be fed from said injecting element to said inlet passage, and fourth temperature regulating means combined with said feed nozzle associated with said second projection.

2. A mould assembly as claimed in claim 1, comprising an insulating plate interposed between each first mould section and the block, each of said projections extending through the respective insulating plate, recesses in the first mould sections into which recesses said first projections respectively extend, each recess having a width exceeding the width of the respective first projections and respective small nozzle and a flat end portion in which flat end portion is provided one of said orifices for filling the respective mould cavity means, said respective small nozzle being in direct contact with said flat end portion.

3. A mould assembly as claimed in claim 2, wherein the means for compensating for the difference in expansion between the block and the moulds comprise on each small nozzle a planar end surface in sliding contact with the flat end portion of the respective recess, the small nozzle having an outlet orifice which coincides with the orifice for filling the respective mould cavity means but has a diameter which is smaller than the diameter of the orifice for filling the mould cavity means.

4. A mould assembly as claimed in claim 1, wherein said means for controlling the flow through each small nozzle comprise a tapped radial hole in the small nozzle and a valve screw which is adjustable in the tapped hole for the purpose of modifying the section of passage through the small nozzle.

5. A mould assembly as claimed in claim 1, wherein the first section and second section of one of the moulds have an opening through which opening said second projection of the block extends.

6. A mould assembly as claimed in claim 5, wherein said feed nozzle associated with said second projection has a body which has a length which is substantially equal to the thickness of the mould through which it extends.

7. A mould assembly as claimed in claim 6, wherein the temperature regulating means for the body of the nozzle associated with said second projection comprise a fluid circulating circuit of passages.

8. A mould assembly as claimed in any one of the preceding claims for use with a moulding press having heating plates, wherein the second mould section of each mould is directly heated by the plates by heat conduction, the first mould sections of the moulds having their own means for regulating their temperature.

9. A mould assembly as claimed in any one of the claims 1 to 7, wherein the first mould sections and second mould sections each comprise independent temperature regulating means.

10. In a mould assembly for use with a press for the injection/compression moulding of elastomers and in particular for the moulding of high precision parts, the mould assembly comprising a centre block, first temperature regulating means in the block, elastomer injecting passage means in the block, at least one mould combined with a first side of the block and at least one second mould combined with a second side of the block opposed to said first side, each mould having a first mould section adjacent the block and a second mould section which is remote from the block and defines with the respective first mould section mould cavity means and a mould parting line, orifices in the first mould sections and communicating with said injecting passage means in the block and associated with the respective mould cavity means for feeding the mould cavity means with elastomer, and adjustable spacer means interposed between the first mould section and second mould section of each mould for adjusting spacing between each first section and second section in the course of the moulding operation; the improvement comprising in combination a plurality of projections extending from said first side of the block and a plurality of projections extending from said second side of the block, the projections being rigid with the block, small nozzles respectively detachably mounted on the projections and engaging said first mould sections and putting said orifices in communication with said injecting passage means in the block, valve means combined with each small nozzle for adjusting the flow of elastomer through the respective small nozzle, second temperature regulating means in said projections and third temperature regulating means in said nozzles, said first, second and third temperature regulating means being independent of one another and having separate ends for connection to separate temperature regulating means, an insulating plate interposed between the block and each first mould section, apertures in the insulating plates for the passage of the projections therethrough, recesses in each first mould section for respectively receiving the projections, each recess having a width larger than the width of the respective projection and small nozzle so as to allow lateral movement of the projections and small nozzles in their respective recesses, each recess having a flat end portion with which flat end portion the respective small nozzle is in laterally slidable engagement, said orifices being respectively provided in said flat end portions and the small nozzles each having an outlet orifice which is smaller than but coincident with the orifice in the respective flat end portion, a substantially central projection extending from and rigid with said first side of the block and defining an inlet passage communicating with said injecting passage means in the block, a feed nozzle associated with the central projection for connection to an injecting element of said press so that the elastomer can be fed from said injecting element to said inlet passage, and fourth temperature regulating means combined with said feed nozzle associated with said central projection nozzle.

11. A mould assembly as claimed in claim 1 or 10, wherein said first temperature regulating means, second temperature regulating means and third temperature regulating means comprise independent fluid circulating circuits of passages.

12. A mould assembly as claimed in claim 1 or 10, wherein said first mould sections each comprise a temperature regulating fluid circulating circuit of passages.

13. A mould assembly as claimed in claim 1 or 10, wherein said first mould sections each comprise a heat regulating electric circuit.

* * * * *

UNITED STATES PATENT AND TRADEMARK OFFICE
CERTIFICATE OF CORRECTION

PATENT NO. : 4,309,163
DATED : Jan. 5, 1982
INVENTOR(S) : Gerard Cottancin

It is certified that error appears in the above-identified patent and that said Letters Patent are hereby corrected as shown below:

Col. 3, 1.39   "of" first occurrence should be -- on --.
Col. 4, 1.16   "24" should be -- 23 --.
Col. 4, 1.20   "an" should be -- and --.
Col. 4, 1.50   "17" should be -- 27 --.
Col. 7, 1.33   "jections" should be -- jection --.

Signed and Sealed this

Thirty-first Day of August 1982

[SEAL]

Attest:

GERALD J. MOSSINGHOFF

*Attesting Officer*    *Commissioner of Patents and Trademarks*